(12) United States Patent
Wolff

(10) Patent No.: US 6,454,310 B1
(45) Date of Patent: Sep. 24, 2002

(54) BEVELED INSERT FOR COUPLING PIPES

(76) Inventor: Steven K. Wolff, 1452 S. Glenview, Mesa, AZ (US) 85204

( * ) Notice: Subject to any disclaimer, the term of this patent is extended or adjusted under 35 U.S.C. 154(b) by 0 days.

(21) Appl. No.: 09/994,139

(22) Filed: Nov. 26, 2001

Related U.S. Application Data

(62) Division of application No. 09/335,006, filed on Jun. 16, 1999, now Pat. No. 6,371,522.

(51) Int. Cl.$^7$ ................................................ F16L 35/00
(52) U.S. Cl. ............................. 285/24; 285/27; 285/345; 285/374
(58) Field of Search .................................. 285/374, 379, 285/24, 27, 148.23, 345, 334.1, 344, 334.3; 138/109

(56) References Cited

U.S. PATENT DOCUMENTS

| | | | | |
|---|---|---|---|---|
| 1,188,485 A | * | 6/1916 | Pruyn ........................ | 285/27 |
| 1,665,812 A | * | 4/1928 | Jones ...................... | 285/334.1 X |
| 2,017,362 A | * | 10/1935 | Werder .................... | 285/334.1 X |
| 2,591,531 A | * | 4/1952 | Fishback ................... | 285/27 X |
| 3,056,616 A | * | 10/1962 | Jaros ...................... | 285/334.1 X |
| 3,429,596 A | * | 2/1969 | Marshall ................... | 285/27 X |
| 3,632,141 A | * | 1/1972 | Larsson .................... | 285/24 |
| 3,831,954 A | * | 8/1974 | Longfellow ............... | 285/27 X |
| 4,907,828 A | * | 3/1990 | Chang ..................... | 285/24 |
| 5,735,553 A | * | 4/1998 | Niemiec .................. | 285/334.1 X |

FOREIGN PATENT DOCUMENTS

| | | | | |
|---|---|---|---|---|
| CA | 1135747 | * | 11/1982 | ............... 285/24 |
| DE | 481850 | * | 9/1929 | ............... 285/27 |
| NL | 6601505 | * | 8/1966 | ............... 285/27 |

* cited by examiner

*Primary Examiner*—Teri Pham Luu
(74) *Attorney, Agent, or Firm*—Parsons & Goltry; Robert A. Parsons; Michael W. Goltry

(57) ABSTRACT

A pipe joint including a first pipe segment having a belled end and an annular gasket carried within the belled end, a second pipe segment having an end inserted into the belled end, passing through the annular gasket, and a beveled insert carried by the end of the second pipe segment for facilitating the insertion of the end of the second pipe segment into the belled end of the first pipe segment passing through the annular gasket.

3 Claims, 2 Drawing Sheets

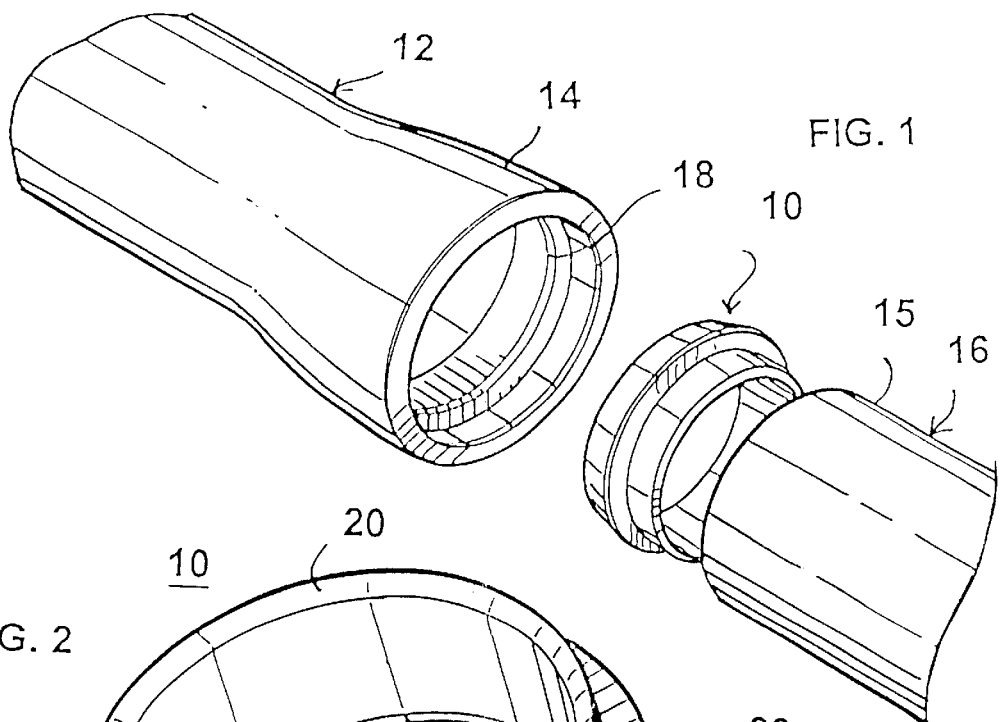
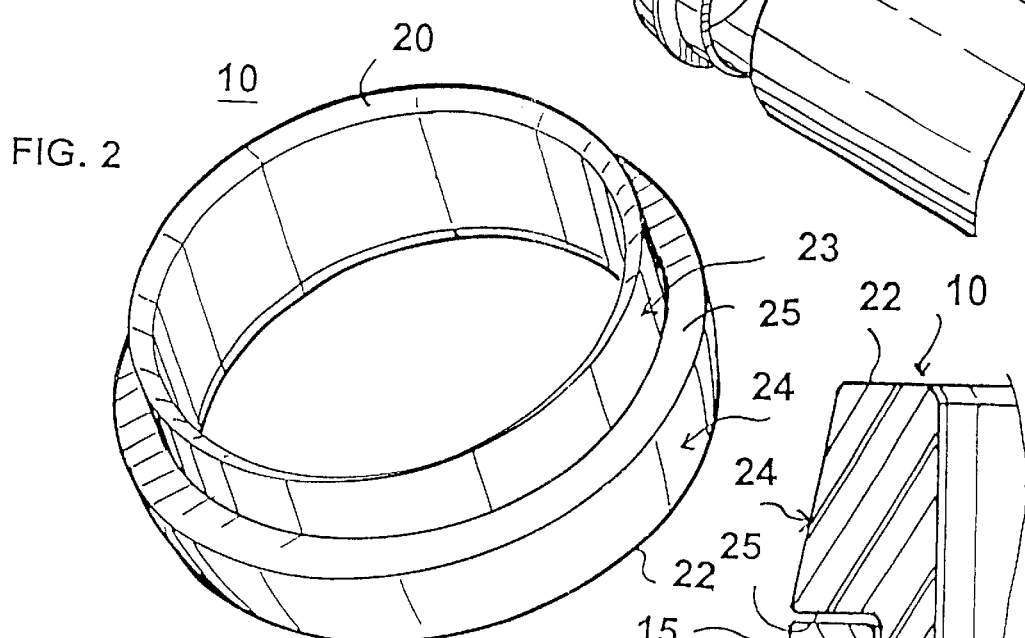
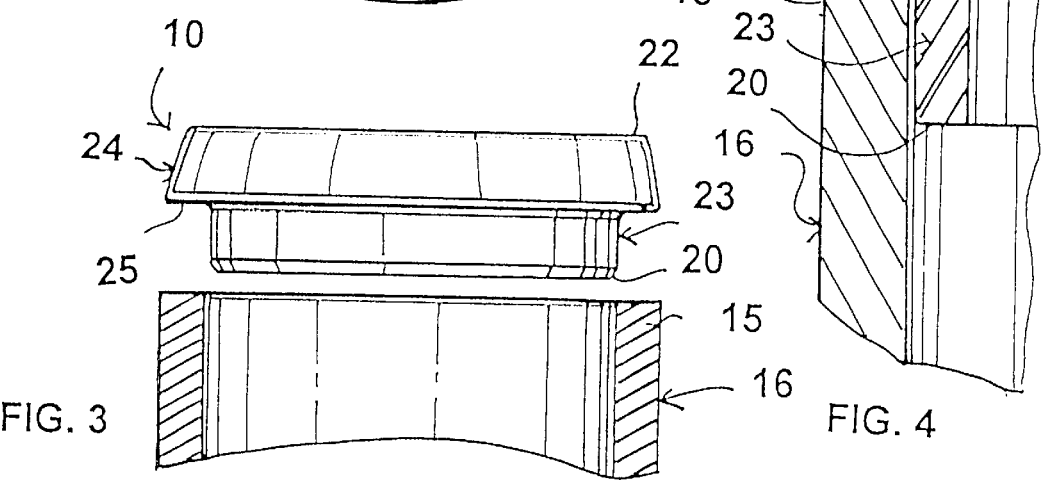
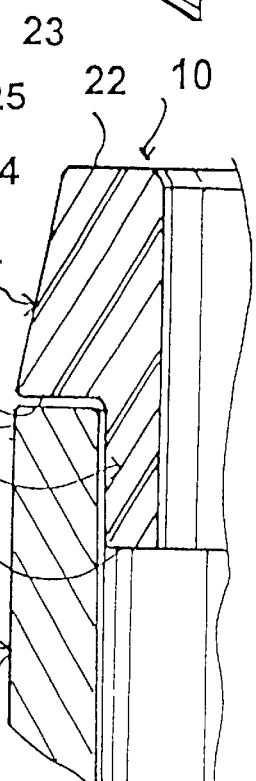

BEVELED INSERT FOR COUPLING PIPES

This application is a continuation, of application Ser. No. 09/335,006 filed Jun. 16, 1999, U.S. Pat. No. 6,371,522.

FIELD OF THE INVENTION

This invention relates to construction materials.

More particularly, the present invention relates to pipe couplings.

In a further and more specific aspect, the instant invention concerns devices for facilitating the coupling of pipes.

BACKGROUND OF THE INVENTION

Pipes have long been used for the delivery of various fluids, and the methods used for their installation are well-established. While the following invention can apply to many types of pipe for the delivery of many types of fluid, the following discussion will be focused upon liquid delivery, namely water pipes. Typically, water mains employ a type of pipe known as ductile iron. Lengths of pipe are coupled by inserting the end of one pipe into a belled end of an adjacent pipe. Using uncut lengths of pipe, this system works quite efficiently. However, problems develop when a length of pipe must be shortened by cutting. The cut end of the pipe has a relatively sharp edge which when inserted into the belled end of the adjacent pipe may damage the gasket located therein. This is typically referred to as "fish mouthing", and results in leakage at the joint.

Conventionally, this problem is overcome by cutting a bevel into the cut pipe end. This, however, creates more problems. Specifically, forming a bevel in ductile iron pipe is extremely difficult. Currently, the bevel is formed using the cut-off saw previously used to cut the pipe to the desired length. The saw used is cumbersome and heavy, has a blade turning at approximately 5600 rpms, and is therefore dangerous and imprecise. Furthermore, the blade manufacturers specifically prohibit this use of the blade, because the stresses are uneven and shattering of the blade tends to occur. As well as being dangerous, forming a bevel in this manner is expensive due to the time in labor and increased number of blades used.

It would be highly advantageous, therefore, to remedy the foregoing and other deficiencies inherent in the prior art.

Accordingly, it is an object of the present invention to provide a new and improved method and apparatus for coupling pipes.

Another object of the invention is to provide a beveled insert, which permits insertion of a pipe end without damaging a sealing gasket.

And another object of the invention is to provide a device for facilitating the insertion of an end of a pipe into an adjacent pipe or fitting.

SUMMARY OF THE INVENTION

Briefly, to achieve the desired objects of the instant invention in accordance with a preferred embodiment thereof, provided is a beveled insert including a collar portion having an insert end and a beveled portion having a bevel end. The collar portion is receivable within a pipe end, and carries the beveled portion such that the insert end and the bevel end form opposing ends of the beveled insert. A shoulder is defined intermediate the insert end and the bevel end for abutting engagement with the pipe end.

In a more specific embodiment, provided is a pipe joint including a first pipe segment having a belled end and an annular gasket carried within the belled end. A second pipe segment has an end inserted into the belled end, passing through the annular gasket. A beveled insert is carried by the end of the second pipe segment for facilitating the insertion of the end of the second pipe segment into the belled end of the first pipe segment passing through the annular gasket.

Further provided is a method of joining pipe segments employing the beveled insert of the present invention.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a perspective exploded view of a beveled insert according to the present invention, as it would appear at a pipe coupling;

FIG. 2 is a perspective view of a beveled insert according to the present invention;

FIG. 3 is a plan view of the beveled insert carried by a cut pipe end;

FIG. 4 is a partial sectional view of the beveled insert taken along the lines 4—4 of FIG. 1;

DETAILED DESCRIPTION OF THE PREFERRED EMBODIMENTS

Figure 5:
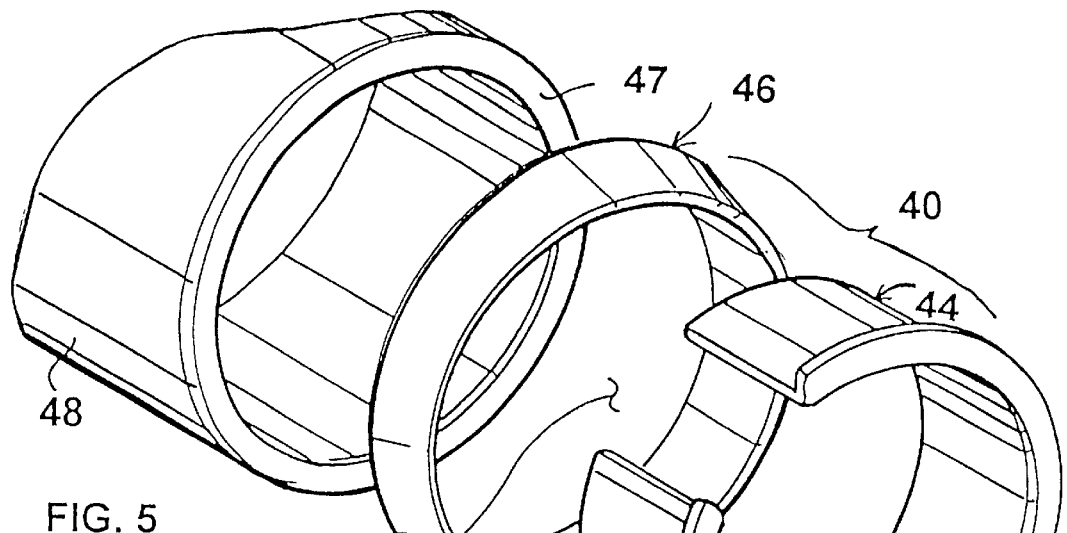
FIG. 5 is exploded view of another embodiment of a beveled insert.

Turning now to the drawings in which like reference characters indicate corresponding elements throughout the several views, attention Is first directed to FIG. 1 which illustrates a beveled insert generally designated 10 as it would appear in relation to a pipe joint. As will be appreciated by those skilled in the art, beveled insert 10 is intended to facilitate the insertion of a pipe end into a receiving pipe end or pipe fitting. It will be understood by those skilled in the art that the beveled insert can be used to couple a pipe to another pipe or to a pipe fitting. The term "pipe" as used in the following description and claims is intended to include both a pipe and a pipe fitting. Thus, the pipe may be constructed of virtually any material, and may be employed to carry substantially any material. For the purposes of the present description however, the pipe to be joined is preferably of the type referred to as ductile iron, and used primarily for water mains. It will also be understood that the present invention may be employed with substantially any diameter pipe.

Still referring to FIG. 1, a pipe segment 12 having a belled end 14 receives a cut end 15 of a pipe segment 16. Belled end 14 is of conventional manufacture and includes an annular gasket 18 carried therein. It should be pointed out that the term "belled" is used here to describe any pipe end which acts as a female fitting and is configured to receive another pipe end, and is Intended to include pipes having an overall larger diameter than the inserted pipe. When a non-uniform length of pipe is required, a portion of a pipe segment must be removed by cutting, resulting in cut end 15. Conventionally, when inserting cut end 15 into belled end 14 damage will occur to annular gasket 18. To prevent damage to annular gasket 18 by cut end 15, often referred to as "fish mouthing", beveled insert 10 is carried by cut end 15. By masking the sharp edges of cut end 15 with beveled insert 10, pipe 16 can be inserted into belled end 14 through annular gasket 18 without any damage occurring thereto.

Turning now to FIG. 2, beveled insert 10 is substantially annular in shape, and includes an insertable end 20 and a bevel end 22. Beveled insert 10 consists of a collar portion 23 at insertable end 20 and a beveled portion 24 at bevel end 22. Collar portion 23 has an outer diameter configured to be received within cut end 15 of pipe segment 16 and an inner diameter. Beveled portion 24 has an outer diameter substantially similar to the outer diameter of cut end 15 of pipe segment 16 proximate insertable end 20, and sloping to a lesser diameter at bevel end 22. The slope of the bevel may be of any pitch so as to efficiently pass annular gasket 18. The outer diameter of beveled portion 24 proximate bevel end 22 is less than the outer diameter of beveled portion 24 proximate insertable end 20 and greater than or equal to the inner diameter of collar portion 23. Beveled portion 24 is preferably shallow so as to terminate with a blunt end at bevel end 22.

Still referring to FIG. 2 with additional reference to FIGS. 3 and 4, a shoulder 25 is defined intermediate insertable end 20 and bevel end 22 by the different outer diameters of outer collar portion 23 and beveled portion 24. Shoulder 25 has a depth approximately the same as the thickness of pipe segment 16 at cut end 15. Beveled insert 10 is coupled to cut end 15 of pipe segment 16 by inserting collar portion 23 within pipe segment 16 with cut end 15 abutting shoulder 25. In this manner the sharp edges of cut end 15 are masked during insertion of pipe segment 16 into belled end 14 of pipe segment 12. Thus, annular gasket 18 remains undamaged and will effectively engage and seal to pipe segment 16 as beveled insert 10 passes completely through annular gasket 18.

In the previous embodiment, beveled insert 10 is preferably constructed of plastic materials such as PVC molded in an integral piece. However, as will be understood by those skilled in the art, other materials such as metal, resins, composites, etc. may be employed. A specific example of another material is a dissolvable material such as sugar. Once insertion of the cut end of a pipe segment through an annular gasket is achieved, beveled insert 10 is no longer required. When liquid flow is supplied to the pipe, beveled insert 10 will dissolve, completely removing any impediment to the liquid flow. In water mains, for example, after installation of the pipe, the pipes are flushed out with a flow of water over a period of time. This flushing process is adequate to dissolve and remove a beveled insert formed of sugar. Other materials contemplated are chlorine, salt, etc.

Referring now to FIG. 5, another embodiment of a beveled insert generally designated 40 is illustrated. Beveled insert 40 is substantially annular in shape, and includes an insertable end 42 and a bevel end 43. Beveled insert 40 consists of a collar portion 44 extending from insertable end 42 to a radially outwardly extending flange 45 at bevel end 43. A beveled portion 46 is received about collar portion 44 and carried at bevel end 43, abutting flange 45. Collar portion 44 has an outer diameter configured to be received within a cut end 47 of a pipe segment 48 and an inner diameter as large as is structurally sound according to the material use. Thus, collar portion 44 is as thin as possible, to reduce as much as possible any obstruction to the flow of materials through the pipe.

Figure 6:
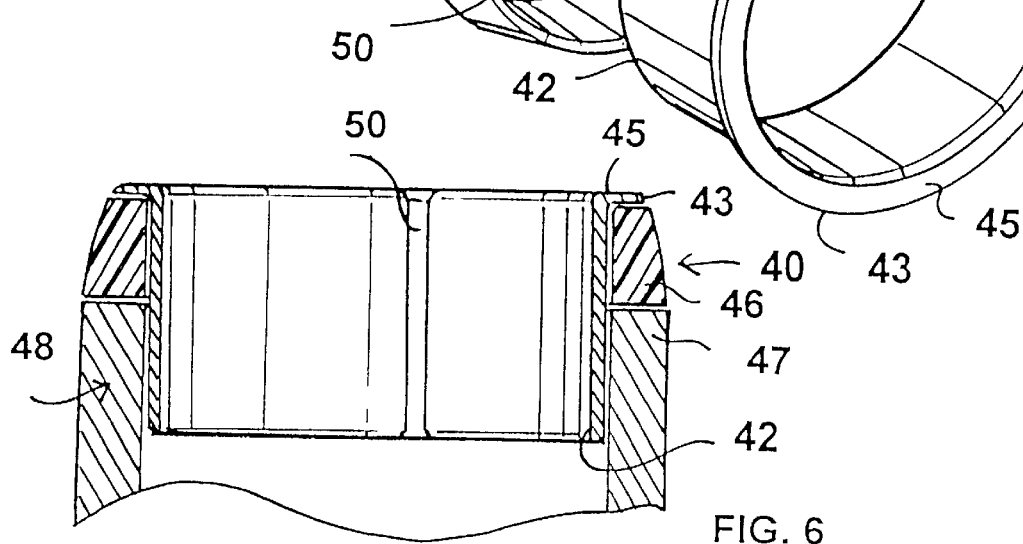
FIG. 6 is a sectional view taken along lying 6—6 of FIG. 5.

Turning now to FIG. 6, beveled portion 45 has an annular shape and is preferably constructed of a plastic material such as PVC. Beveled portion 45 has an inner diameter substantially identical to the inner diameter of pipe segment 48 and an outer diameter substantially similar to the outer diameter of cut end 47 of pipe segment 48, proximate insertable end 42, and sloping to a lesser diameter at bevel end 43. The slope of the bevel may be of any pitch so as to efficiently passed an annular gasket. Beveled portion 45 is inserted over insertable end 42 of collar portion 44 and position abutting flange 45 to form bevel end 43. Flange 45 has a diameter preferably equal to or less than the outer diameter of beveled portion 45 proximate bevel end 43.

Still referring to FIG. 6 with reference back to FIG. 5, collar portion 44 is severed longitudinally, forming a gap 50 therein. This permits the contraction or expansion of collar portion 44, allowing for its use in a plurality of different diameter pipes. Collar portion 44 is preferably formed of a strong, resilient material, such as metal, and is also preferably non-corrosive. These characteristics are met by stainless steel, which is the preferred material. Thus, beveled insert 40 can be employed with different size pipes simply by replacing an appropriately sized beveled portion 45 on collar portion 44. It will be understood by those skilled in the art that collar portion 44 can be formed of a continuous unbroken ring which would then be limited to a single size pipe.

Figure 7:
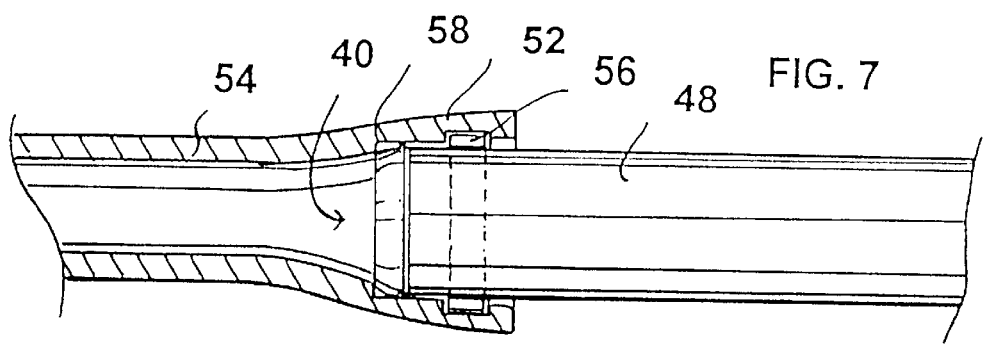
FIG. 7 is a side view illustrating a pipe coupling according to the present invention.

Turning now to FIG. 7 beveled insert 40 Is inserted into cut end 47 of pipe segment 48 such that beveled portion 46 masks cut end 47. Cut end 47 is inserted into a belled end 52 of a pipe segment 54. The belled end 52 includes an annular gasket 56 to provide sealing engagement with pipe segment 48. A shoulder 58 is formed on the inner surface of pipe segment 54 at the base of belled end 52, against which cut end 47 of pipe segment 48 is seated. Thus, beveled portion 46 need not be affixed to collar portion 44. Furthermore, beveled insert 40 need not be permanently affixed to cut end 47 of pipe segment 48 since it is captured between cut end 47 and shoulder 58 of pipe segment 54.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of joining pipe segments comprising the steps of:

providing a first pipe segment having a belled end and an annular gasket carried within the belled end;

providing a second pipe segment having an end;

providing a beveled insert;

inserting the beveled insert into the end of the second pipe segment; and inserting the end of the second pipe segment into the belled end, passing through the annular gasket.

2. A method as claimed in claim 1 wherein the step of providing a second pipe segment having an end includes cutting the pipe segment to form the end.

3. A method as claimed in claim 2 wherein the step of providing the beveled insert includes providing a beveled insert including:

a collar portion having an insert end, the collar portion receivable within the end of the second pipe segment;

a beveled portion having a bevel end;

the collar portion carrying the beveled portion such that the insert end and the bevel end form opposing ends of the beveled insert; and a shoulder defined intermediate the insert end and the bevel end for abutting engagement with the end of the second pipe segment.

\* \* \* \* \*